(12) United States Patent
Sugimura et al.

(10) Patent No.: US 10,114,940 B2
(45) Date of Patent: Oct. 30, 2018

(54) INFORMATION PROCESSING SYSTEM, INFORMATION PROCESSING APPARATUS, AND INFORMATION PROCESSING METHOD

(71) Applicants: Kazunori Sugimura, Kanagawa (JP); Yuuichiroh Hayashi, Kanagawa (JP); Kohsuke Namihira, Tokyo (JP); Dongzhe Zhang, Tokyo (JP)

(72) Inventors: Kazunori Sugimura, Kanagawa (JP); Yuuichiroh Hayashi, Kanagawa (JP); Kohsuke Namihira, Tokyo (JP); Dongzhe Zhang, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 319 days.

(21) Appl. No.: 15/050,796

(22) Filed: Feb. 23, 2016

(65) Prior Publication Data
US 2016/0259933 A1 Sep. 8, 2016

(30) Foreign Application Priority Data
Mar. 6, 2015 (JP) .................................. 2015-044571

(51) Int. Cl.
*G06F 7/04* (2006.01)
*G06F 21/44* (2013.01)
*G06F 21/62* (2013.01)

(52) U.S. Cl.
CPC ............ *G06F 21/44* (2013.01); *G06F 21/629* (2013.01)

(58) Field of Classification Search
CPC .............................. G06F 21/44; G06F 21/629
(Continued)

(56) References Cited

U.S. PATENT DOCUMENTS

2010/0306840 A1* 12/2010 Yoshida ............. H04N 1/00949
726/9
2014/0223535 A1* 8/2014 Fukuda ................... G06F 21/31
726/10

(Continued)

FOREIGN PATENT DOCUMENTS

JP 2013-196422 9/2013

*Primary Examiner* — Teshome Hailu
(74) *Attorney, Agent, or Firm* — IPUSA, PLLC

(57) ABSTRACT

An information processing system includes a storage unit that stores, with respect to each application, application identification information identifying the application for executing a series of processes in cooperation with an external service and information relating to the series of processes; a receiving unit that receives from a device connected to the information processing system, a request including first authentication information acquired by the device from an authentication infrastructure, the application identification information, and information relating to electronic data designated by a user at the device; an acquisition unit that acquires second authentication information for using the external service based on the first authentication information included in the received request; and an execution unit that executes a process on the electronic data based on the information relating to the series of processes associated with the application identification information included in the received request using the acquired second authentication information.

7 Claims, 16 Drawing Sheets

(58) Field of Classification Search
USPC .......................................................... 726/17
See application file for complete search history.

(56) References Cited

U.S. PATENT DOCUMENTS

| 2014/0317400 | A1* | 10/2014 | Slodki | G06F 21/121 |
| | | | | 713/155 |
| 2014/0331292 | A1* | 11/2014 | Krieger | H04L 63/083 |
| | | | | 726/5 |
| 2015/0339475 | A1* | 11/2015 | Feroz | G06F 21/53 |
| | | | | 726/23 |

* cited by examiner

FIG.5

USER ID:user002

USER ID:user001

| KEY INFORMATION | COOPERATION DESTINATION INFORMATION | AUTHENTICATION INFORMATION |
|---|---|---|
| Service A | Storage Service A | ServiceAtokenInformation |
| Service B | Storage Service B | ServiceBtokenInformation |
| Service C | Storage Service C | ServiceCuserID/Password |
| ... | ... | ... |

| COMMON I/F | DESCRIPTION |
|---|---|
| /externalservicename/process/file | Acquire file from designated storage service |
| /externalservicename/process/folder | Store file in designated storage service |
| ... | ... |

FIG.6B

| SPECIFIC I/F | DESCRIPTION |
|---|---|
| /externalservicename/process/extension/attach | Attach file to document stored in designated storage service |
| ... | ... |

FIG.6C

| COMMON I/F | DESCRIPTION |
|---|---|
| /externalservicename/data/files | Acquire file list from designated storage service |
| /externalservicename/data/folders | Acquire folder list from designated storage service |
| ... | ... |

FIG.6D

| SPECIFIC I/F | DESCRIPTION |
|---|---|
| /externalservicename/data/extension/images | Acquire image file list from designated storage service |
| ... | ... |

FIG.7

```
flowid:flow1
From("file:input")
.to("process:auth")
.to("storage:send_to_folder?type=service-a")
```

FIG.14

USER ID:user002

USER ID:user001

| KEY INFORMATION | COOPERATION DESTINATION INFORMATION | AUTHENTICATION INFORMATION |
|---|---|---|
| key1 | Storage Service A | ServiceAtokenInformation |
| key2 | Storage Service B | ServiceBtokenInformation |
| key3 | Storage Service C | ServiceCuserID/Password |
| ... | ... | ... |

```
flowid:flow2
From("file:input")
.to("process:local_auth")
.to("storage:send_to_folder?type=service-a")
```

INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method.

2. Description of the Related Art

Recently, a variety of external services are becoming available through cloud computing and the like, and there are known techniques for enabling a device to perform a process in cooperation with such external services. For example, a technique is known for storing scanned image data obtained by an image forming apparatus in an external storage service.

Such a device that performs a process in cooperation with an external service may be authenticated using an authentication infrastructure for executing common authentication with respect to a plurality of external services (e.g., see Japanese Laid-Open Patent Publication No. 2013-196422).

However, in the above related art, the authentication infrastructure used by the device that performs a process in cooperation with an external service is fixed. Thus, for example, it has been difficult to flexibly change the authentication infrastructure to be used by the device in a case where the user of the device that performs a process in cooperation with an external service wishes to use a different authentication infrastructure, for example.

SUMMARY OF THE INVENTION

One aspect of the present invention is directed to providing support for changing an authentication infrastructure of an external service.

According to one embodiment of the present invention, an information processing system is provided that includes at least one information processing apparatus. The information processing system includes a storage unit configured to store, with respect to each application, application identification information identifying the application for executing a series of processes using electronic data in cooperation with an external service and information relating to the series of processes in association with each other; a receiving unit configured to receive from a device connected to the information processing system, a request including first authentication information acquired by the device from an authentication infrastructure, the application identification information, and information relating to designated electronic data that has been designated by a user at the device; an acquisition unit configured to acquire second authentication information for using the external service based on the first authentication information included in the request that has been received by the receiving unit; and an execution unit configured to execute a process based on the information relating to the series of processes that is stored in the storage unit in association with the application identification information included in the request that has been received by the receiving unit, the process being executed with respect to the designated electronic data that is identified based on the information relating to the designated electronic data included in the request, and the execution unit using the second authentication information that has been acquired by the acquisition unit to execute the process.

BRIEF DESCRIPTION OF THE DRAWINGS

FIG. 5 illustrates an exemplary configuration of cooperation authentication information;

FIGS. 6A-6D illustrate examples of common interfaces and specific interfaces;

FIG. 7 illustrates an example of a process content;

FIG. 14 illustrates another exemplary configuration of cooperation authentication information;

FIG. 16 illustrates another example of a process content.

DESCRIPTION OF THE PREFERRED EMBODIMENTS

In the following, embodiments of the present invention are described with reference to the accompanying drawings.

First Embodiment

<System Configuration>

Figure 1:
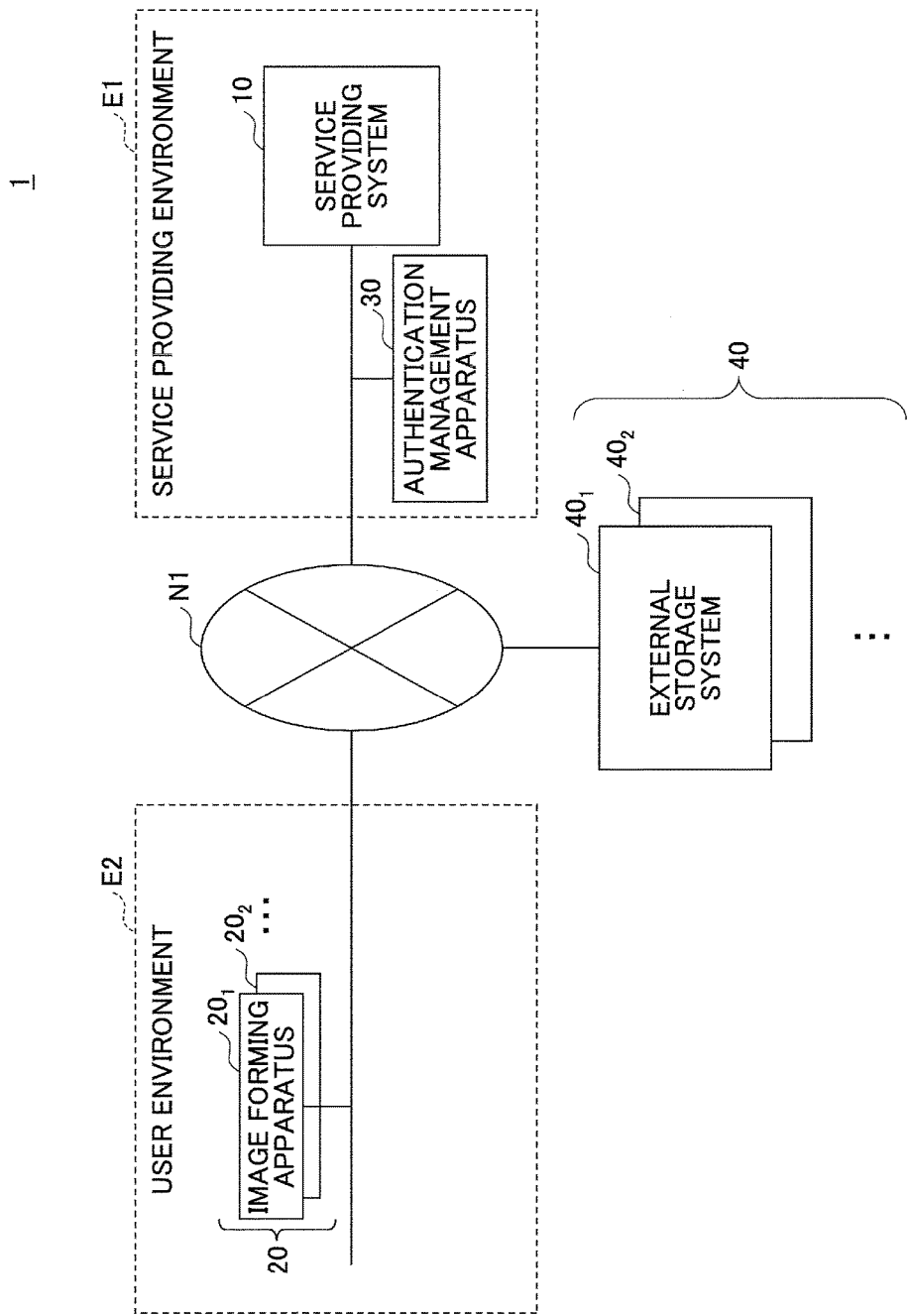
FIG. 1 illustrates an exemplary system configuration of an information processing system according to a first embodiment of the present invention.

First, the system configuration of an information processing system 1 according a first embodiment of the present invention will be described with reference to FIG. 1. FIG. 1 illustrates an exemplary system configuration of the information processing system 1 according to the first embodiment. In FIG. 1, the information processing system 1 includes a service providing environment E1, a user environment E2, and an external storage system 40 that are communicatively connected via a wide area network N1 such as the Internet.

The service providing environment E1 is a system environment that provides an external service such as a cloud service via a network. In the following descriptions of the present embodiment, a cloud service is illustrated as a specific example of an external service that is provided by the service providing environment E1. However, the present embodiment may also be applied with respect to other services provided via a network such as a service provided by an ASP (Application Service Provider), or a web service, for example.

The service providing environment E1 includes a service providing system 10 that is implemented by at least one information processing apparatus, and an authentication management apparatus 30 that is implemented by at least one information processing apparatus. The service providing system 10 provides a predetermined service in cooperation with an external service. For example, the service providing system 10 may provide a service of storing an electronic file of a scanned document generated by an image forming apparatus 20 of the user environment E2 in the external storage system 40 (scan delivery service). In the following description of the present embodiment, the scan delivery service is described as a specific example of a service provided by the service providing system 10.

Note, however, that the service provided by the service providing system 10 is not limited to the scan delivery service. For example, the service providing system 10 may provide a service of printing an electronic file stored in the external storage system 40 at the image forming apparatus 20 of the user environment E2 (cloud print service). Also, the service providing system 10 may provide a service of performing a predetermined process (e.g., OCR process or language translation process) on an electronic file of a scanned document generated by the image forming apparatus 20 of the user environment E2 and storing the resulting processed electronic file in the external storage system 40, for example. Further, the service providing system 10 may provide a service of projecting an electronic file stored in the external storage system 40 at a projector (not shown) provided within the user environment E2, for example.

The authentication management apparatus 30 stores authentication information for using an external service. When the image forming apparatus 20 uses a predetermined service provided by the service providing system 10, the authentication management apparatus 30 functions as an authentication infrastructure of the external service that is to cooperate with the predetermined service provided by the service providing system 10. That is, in the scan delivery service provided by the service providing system 10 according to the present embodiment, the authentication management apparatus 30 functions as an authentication infrastructure of the external storage system 40 corresponding to a storage destination of an electronic file.

Note that in some embodiments, all or a part of the service providing system 10 may be included in the user environment E2. In other words, all or a part of the functions of the information processing apparatus constituting the service providing system 10 may be included in the user environment E2.

The user environment E2 may be a system environment of a user such as a corporation that uses the image forming apparatus 20, for example. The user environment E2 may include one or more image forming apparatuses 20 that are interconnected via a network such as a LAN (Local Area Network).

The image forming apparatus 20 according to the present embodiment includes a scan function. Note that the image forming apparatus 20 may be a multifunction peripheral including other functions such as a print function, a copy function, facsimile (FAX) function, and the like in addition to a scan function, for example.

The external storage system 40 is a computer system that provides a cloud service that is referred to as storage service (or online storage) via a network. A storage service is a service that rents out storage space of the external storage system 40. In the scan delivery service according to the present embodiment, an electronic file is stored (uploaded) in the storage space provided by the external storage system 40.

Note that in the following descriptions, when distinctions are to be made between a plurality of external storage systems 40, a numerical subscript may be used to identify each of the external storage systems 40 such as "external storage system $40_1$," and "external storage system $40_2$". Also, in the following descriptions, it is assumed that "Storage Service A" represents the name of a service provided by the external storage system $40_1$, and "Storage Service B" represents the name of a service provided by the storage system $40_2$.

Also, the external storage system 40 may be a system implemented by a plurality of information processing apparatuses. Further, note that the configuration of the information processing system 1 illustrated in FIG. 1 is merely one example, and the information processing system 1 may have other various system configurations. For example, the user environment E2 may include other various devices such as a projector, an electronic blackboard, a mobile phone, and/or a smartphone in addition to or instead of the image forming apparatus 20.

<Hardware Configuration>

In the following, hardware configurations of the service providing system 10 and the image forming apparatus 20 according to the present embodiment will be described with reference to FIGS. 2 and 3.

«Service Providing System»

Figure 2:
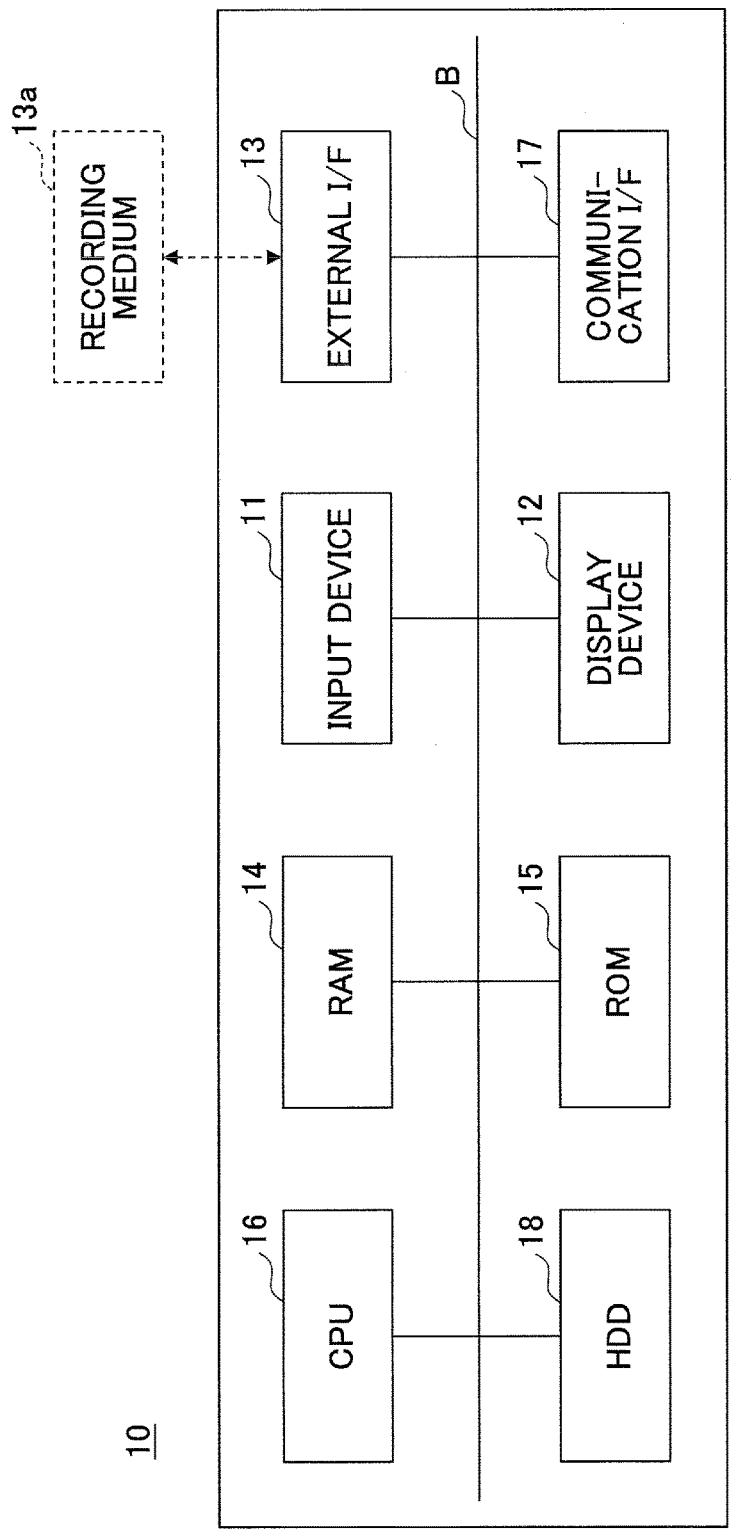
FIG. 2 illustrates an exemplary hardware configuration of a service providing system according to the first embodiment.

The service providing system 10 illustrated in FIG. 1 may have a hardware configuration as illustrated in FIG. 2, for example. FIG. 2 illustrates an exemplary hardware configuration of the service providing system 10 according to the first embodiment. In FIG. 2, the service providing system 10 includes an input device 11, a display device 12, an external I/F (interface) 13, and a RAM (Random Access Memory) 14. Further, the service providing system 10 includes a ROM (Read Only Memory) 15, a CPU (Central Processing Unit) 16, a communication I/F 17, and a HDD (Hard Disk Drive) 18. These hardware elements are interconnected by a bus B.

The input device 11 may include a keyboard, a mouse, and/or a touch panel, for example. The input device 11 is used by the user to input an operation signal. The display device 12 may include a display, for example, and is configured to display a process result of the service providing system 10. Note that in some embodiments, the input device 11 and the display device 12 may be external units that are connected to the service providing system 10 as necessary upon being used, for example.

The communication I/F 17 is an interface for connecting the service providing system 10 to the network N1. In this way, the service providing system 10 may perform data communication via the communication I/F 17.

The HDD 18 is an example of a nonvolatile storage device that stores programs and data. The programs and data stored in the HDD 18 may include an OS (Operating System) corresponding to basic software for performing overall control of the service providing system 10 and application software for providing various functions on the OS, for example. Note that the service providing system 10 may alternatively include a drive device that uses a flash memory as a storage medium (e.g., SSD: Solid State Drive) instead of the HDD 18, for example. Also, the HDD 18 may manage the programs and data stored therein using a predetermined file system and/or a database (DB).

The external I/F 13 is an interface with an external device. The external device may be a recording medium 13a, for example. The service providing system 10 may perform read/write operations on the recording medium 13a via the external I/F 13. The recording medium 13a may be a flexible disk, a CD, a DVD, a SD memory card, a USB memory, or the like.

The ROM 15 is a nonvolatile semiconductor memory (storage device) that is capable of retaining programs and data even when the power is turned off. The ROM 15 may store programs and data such as BIOS (Basic Input/Output System) that is executed upon starting the service providing system 10, OS settings, network settings, and the like. The RAM 14 is a volatile semiconductor memory (storage device) for temporarily storing programs and data.

The CPU 16 is a processor that implements overall control and functions of the service providing system 10 by loading programs and data stored in a storage device such as the ROM 15 or the HDD 18 into the RAM 14, and executing processes based thereon, for example.

The service providing system 10 according to the present embodiment may implement various processes as described below using the hardware configuration as described above.

«Image Forming Apparatus»

Figure 3:
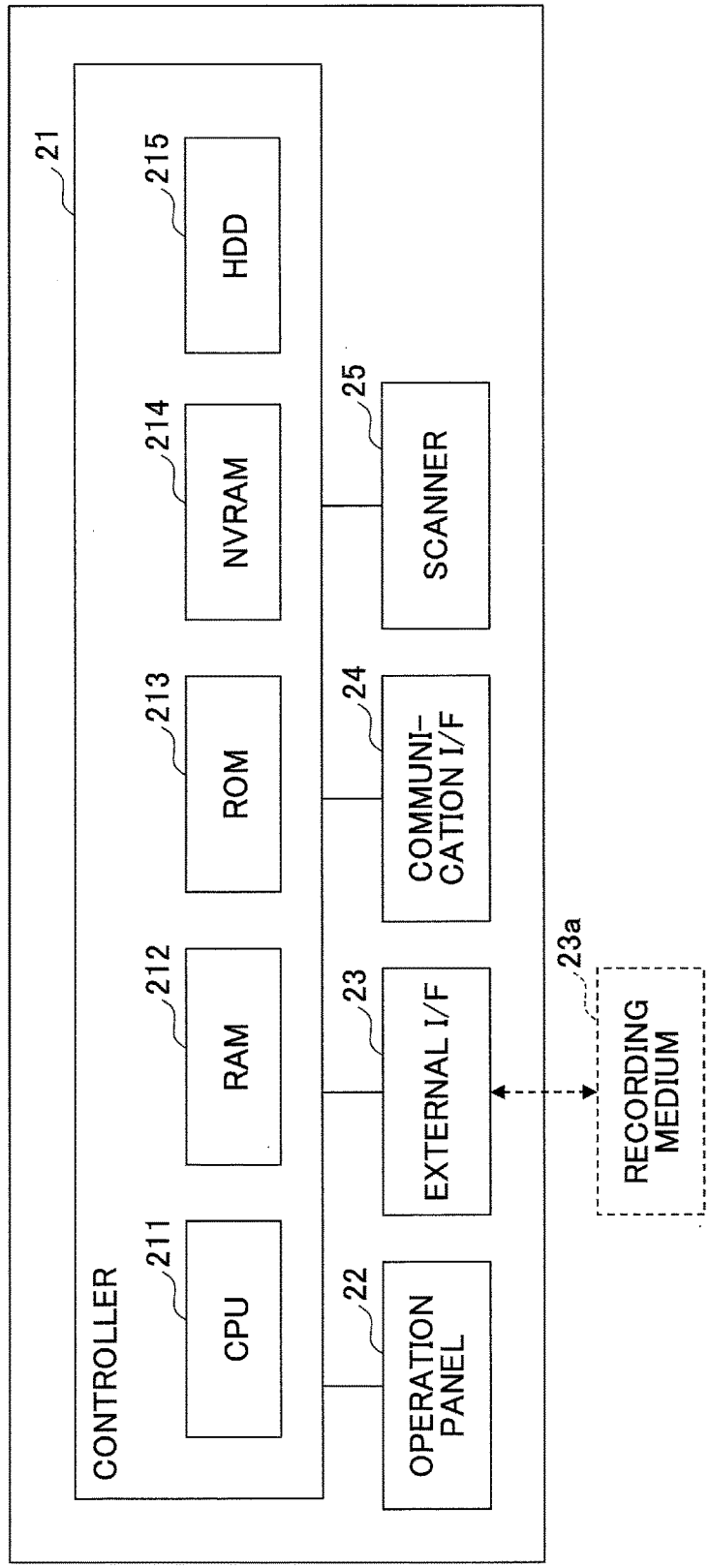
FIG. 3 illustrates an exemplary hardware configuration of an image forming apparatus according to the first embodiment.

The image forming apparatus 20 illustrated in FIG. 1 may have a hardware configuration as illustrated in FIG. 3, for example. FIG. 3 illustrates an exemplary hardware configuration of the image forming apparatus 20 according to the first embodiment. In FIG. 3, the image forming apparatus 20 includes a controller 21, an operation panel 22, an external I/F 23, a communication I/F 24, and a scanner 25. The controller 21 includes a CPU 211, a RAM 212, a ROM 213, a NVRAM 214, and an HDD 215. The ROM 213 stores various programs and data. The RAM 212 temporarily stores programs and data. The NVRAM 214 may store setting information and the like, for example. The HDD 215 also stores various programs and data.

The CPU 211 implements overall control and functions of the image forming apparatus 20 by loading programs, data, and setting information from the ROM 213, the NVRAM 214, the HDD 215 or the like into the RAM 212, and executing processes based thereon, for example.

The operation panel 22 includes an input unit for accepting an input from a user, and a display unit. The external I/F 23 is an interface with an external device. The external device may be a recording medium 23a, for example. The image forming apparatus 20 may perform read/write operations on the recording medium 23a via the external I/F 23. The recording medium 23a may be an IC card, a flexible disk, a CD, a DVD, an SD memory card, a USB memory, or the like.

The communication I/F 24 is an interface for connecting the image forming apparatus 20 to the network N1. In this way, the image forming apparatus 20 may perform data communication via the communication I/F 24. The scanner 25 is a scanning device for scanning a document and generating an image file (electronic file) of the scanned document.

The image forming apparatus 20 according to the present embodiment may implement various processes as described below using the hardware configuration as described above, for example.

<Software Configuration>

Figure 4:
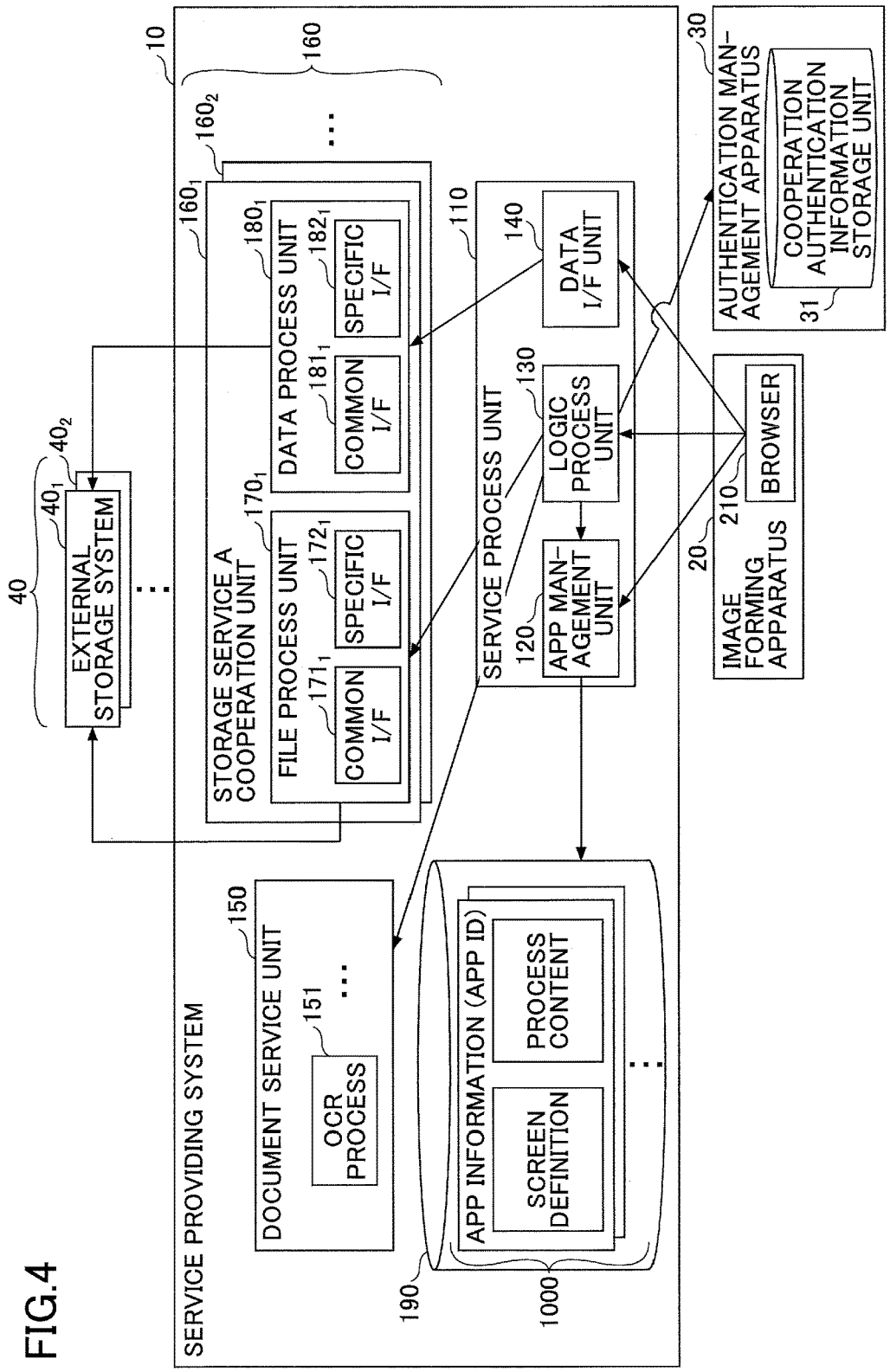
FIG. 4 illustrates an exemplary functional configuration of the information processing system according to the first embodiment.

In the following, a functional configuration of the information processing system 1 according to the present embodiment will be described with reference to FIG. 4. FIG. 4 is a process block diagram illustrating an exemplary functional configuration of the information processing system 1 according to the first embodiment.

In FIG. 4, the image forming apparatus 20 includes a browser 210 that may be implemented by the CPU 211, for example. A user of the image forming apparatus 20 may be able to use a service provided by the service providing system 10 via the browser 210. Thus, in the image forming apparatus 20 according to the present embodiment, for example, a dedicated application for using a service does not have to be developed as long as the browser 210 is installed in the image forming apparatus 20.

The authentication management apparatus 30 includes a cooperation authentication information storage unit 31. The cooperation authentication information storage unit 31 may be implemented by a storage device included in the authentication management apparatus 30, for example. The cooperation authentication information storage unit 31 stores cooperation authentication information 31D including authentication information of the external storage system 40 that is to cooperate with the service providing system 10 to execute a process. For example, as illustrated in FIG. 5, the cooperation authentication information 31D may store, with respect to each "user ID", "key information" for identifying the authentication information of the external storage system 40 that is to execute a process in cooperation with the service providing system 10 and "cooperation destination information" indicating the name of the external storage system 40. Also, the cooperation authentication information 31D may store, with respect to each "user ID", "authentication information" for using the external storage system 40. Note that in the present example, "user ID" corresponds to identification information for uniquely identifying the user of the authentication infrastructure (i.e., the authentication management apparatus 30). Also, as the "authentication information", authentication information for using the external storage system 40 such as an authentication token of the external storage system 40 or a user ID/password may be stored, for example.

In FIG. 4, the service providing system 10 includes a service process unit 110, a document service unit 150, and a storage service cooperation unit 160. These functional components may be implemented by the CPU 16 executing one or more programs that are installed or downloaded in the service providing system 10, for example.

The service providing system 10 also includes an app (application) information storage unit 190. The app information storage unit 190 may be implemented by the HDD 18, for example. Alternatively, the app information storage unit 190 may be implemented by a storage device or the like that is connected to the service providing system 10 via a network, for example.

The service process unit 110 includes an app management unit 120, a logic process unit 130, and a data I/F unit 140.

The app management unit 120 manages app information 1000 that is stored in the app information storage unit 190. Upon receiving a request from the browser 210, the app management unit 120 returns an app screen based on a screen definition included in the app information 1000 to the browser 210. In this way, an app screen for using a service provided by the service providing system 10 may be displayed by the browser 210 of the image forming apparatus 20. Note that in the present embodiment, the app information 1000 corresponds to information describing a screen definition for displaying the app screen as described above at the image forming apparatus 20 and a process content of a service to be implemented by the app information 1000.

Also, upon receiving a request from the logic process unit 130, the app management unit 120 returns the process content included in the app information 1000 to the logic process unit 130. As described in detail below, a series of processes for implementing a service provided by the service providing system 10 such as the scan delivery service is described in the process content of the app information 1000.

The logic process unit 130 acquires the process content from the app management unit 120 in response to a request from the browser 210. Then, based on the acquired process content, the logic process unit 130 sends process execution requests to relevant units such as the authentication management apparatus 30, the document service unit 150, and/or a file process unit 170 of the storage service cooperation unit 160, for example. In this way, various services by the service providing system 10 may be provided to the image forming apparatus 20. Note that a functional configuration of the logic process unit 130 is described in detail below.

The data I/F unit 140 sends a predetermined request (e.g., folder list acquisition request) to a data process unit 180 of the storage service cooperation unit 160 in response to a request from the browser 210.

The document service unit 150 corresponds to a group of programs (modules) for implementing the services provided by the service providing system 10. For example, the document service unit 150 may include an OCR process 151 for executing an OCR process on an electronic file. Also, the document service unit 150 may include a program for enabling the image forming apparatus 20 to convert an electronic file into data in a printable data format (print data), a program for compressing or decompressing an electronic file, and/or other programs for executing various processes, for example.

The storage service cooperation unit 160 sends various process execution requests to the external storage system 40 in response to requests from the logic process unit 130 and the data I/F unit 140. Note that in the present embodiment, the service providing system 10 includes a storage service cooperation unit 160 for each external storage system 40. That is, the service providing system 10 includes a storage service A cooperation unit $160_1$ for sending a process request to the external storage system $40_1$, a storage service B cooperation unit $160_2$ for sending a process request to the external storage system $40_2$, and so forth. In this way, the service providing system 10 includes a storage service cooperation unit 160 corresponding to each external storage system 40 with which the service providing system 10 cooperates to execute various processes. Note that in the following descriptions, when distinctions are to be made between the plurality of storage service cooperation units 160, a numerical subscript may be used to identify each of the storage service cooperation units 160 such as "storage service A cooperation unit $160_1$" and "storage service B cooperation unit $160_2$".

Also, as described above, the storage service cooperation unit 160 includes the file process unit 170 for accepting a request from the logic process unit 130, and the data process unit 180 for accepting a request from the data I/F unit 140.

The file process unit 170 includes a common I/F 171 and a specific I/F 172 that define APIs (Application Programming Interface) for performing operations (e.g., acquisition, storage, editing) on an electronic file stored in the external storage system 40. The common I/F 171 corresponds to an API that can be used among the plurality of external storage systems 40. For example, the common I/F 171 of the file process unit 170 may include APIs as illustrated in FIG. 6A. In other words, the common I/F 171 of the file process unit 170 corresponds to a group of APIs for implementing functions related to file operations (e.g., file acquisition, file storage) that can be used by all of the external storage systems 40. On the other hand, the specific I/F 172 corresponds to an API that can be implemented in a specific external storage system 40. The specific I/F 172 may include an API as illustrated in FIG. 6B, for example. In other words, the specific I/F 172 of the file process unit 170 corresponds to a group of APIs for implementing a function related to a file operation (e.g., file editing) that can be used by a specific external storage system 40. Thus, the common I/F 171 is identically defined in all of the storage service cooperation units 160, whereas the specific I/F 172 is defined in the storage service cooperation unit 160 for the specific external storage 40 in which the API defined by the specific I/F 172 can be implemented.

The data process unit 180 includes a common I/F 181 and a specific I/F 182 that define APIs for performing operations such as acquiring bibliographic information or some other metadata (e.g., file list, folder list) relating to an electronic file stored in the external storage system 40. The common I/F 181 of the data process unit 180 corresponds to an API that can be commonly used among the plurality of external storage systems 40. For example, the common I/F 181 may include APIs as illustrated in FIG. 6C. In other words, the common I/F 181 of the data process unit 180 corresponds to a group of APIs for implementing functions such as metadata acquisition that can be used by all of the external storage systems 40. On the other hand, the specific I/F 182 corresponds to an API that can be implemented in a specific external storage system 40. For example, the specific I/F 182 may include an API as illustrated in FIG. 6D. In other words, the specific I/F 182 of the data process unit 180 corresponds to a group of APIs for implementing a function such as metadata acquisition (e.g., acquisition of an image file list) that can be used by a specific external storage system 40. Thus, the common I/F 181 is identically defined in all of the storage service cooperating units 160, whereas the specific I/F 182 is defined in the storage service cooperation unit 160 for the specific external storage 40 in which the API defined by the specific I/F 182 can be implemented. Note that an additional storage service cooperation unit 160 may be added using a SDK (Software Development Kit), for example.

Note that the APIs defined in the common I/Fs 171, 181, and the specific I/Fs 172, 182 illustrated in FIGS. 6A-6D may be used by designating the name of a desired storage service (storage service name) in the "externalservicename". That is, the "externalservicename" is defined as a variable part of the APIs.

The app information storage unit 190 stores the app information 1000. The app information 1000 is information describing a screen definition for displaying an app screen at the image forming apparatus 20 and a process content indicating a series of processes for implementing a service provided by the service providing system 10. The app information storage unit 190 stores the app information 1000 with respect to each app ID that uniquely identifies the app information 1000. In the present embodiment, it is assumed that "app information $1000_1$" corresponds to the app information for implementing a scan delivery service in cooperation with the storage service A, and "app001" corresponds to the app ID of the app information $1000_1$.

FIG. 7 illustrates an example of the process content included in the app information $1000_1$. That is, FIG. 7 illustrates an example of a process content describing a series of processes for implementing a scan delivery service provided by the service providing system 10. The process content illustrated in FIG. 7 describes a series of processes to be implemented with respect to a scanned electronic file that includes acquiring authentication information of the storage service A and delivering the electronic file to a specified folder of the storage service A. Also, the process content describing the series of processes is associated with a flow ID "flow1" uniquely identifying the process content. Note that the portion "?type=service-a" of ".to("storage:send_to_folder?type=service-a")" described in the process content of FIG. 7 corresponds to an optional parameter. This optional parameter indicates that the storage service A corresponds to the delivery destination (upload destination) for the scan delivery service.

Note that the series of processes described in FIG. 7 is merely one illustrative example of the process content for implementing the scan delivery service. In some examples, the series of processes for implementing the scan delivery service may include a process implemented by a program included in the document service unit 15. For example, the scan delivery service may be implemented by a series of processes to be performed on a scanned electronic file that includes acquiring authentication information of the storage service A, performing an OCR process on the scanned electronic file, and delivering the processed electronic file to a specific folder of the storage service A.

Also, in the example described above, the app information $1000_1$ includes one set of process content (process content with the flow ID "flow1"). However, in other examples, one set of app information 1000 may include a plurality of process contents. That is, one set of the app information 1000 may include different process contents with different flow IDs.

Figure 8:
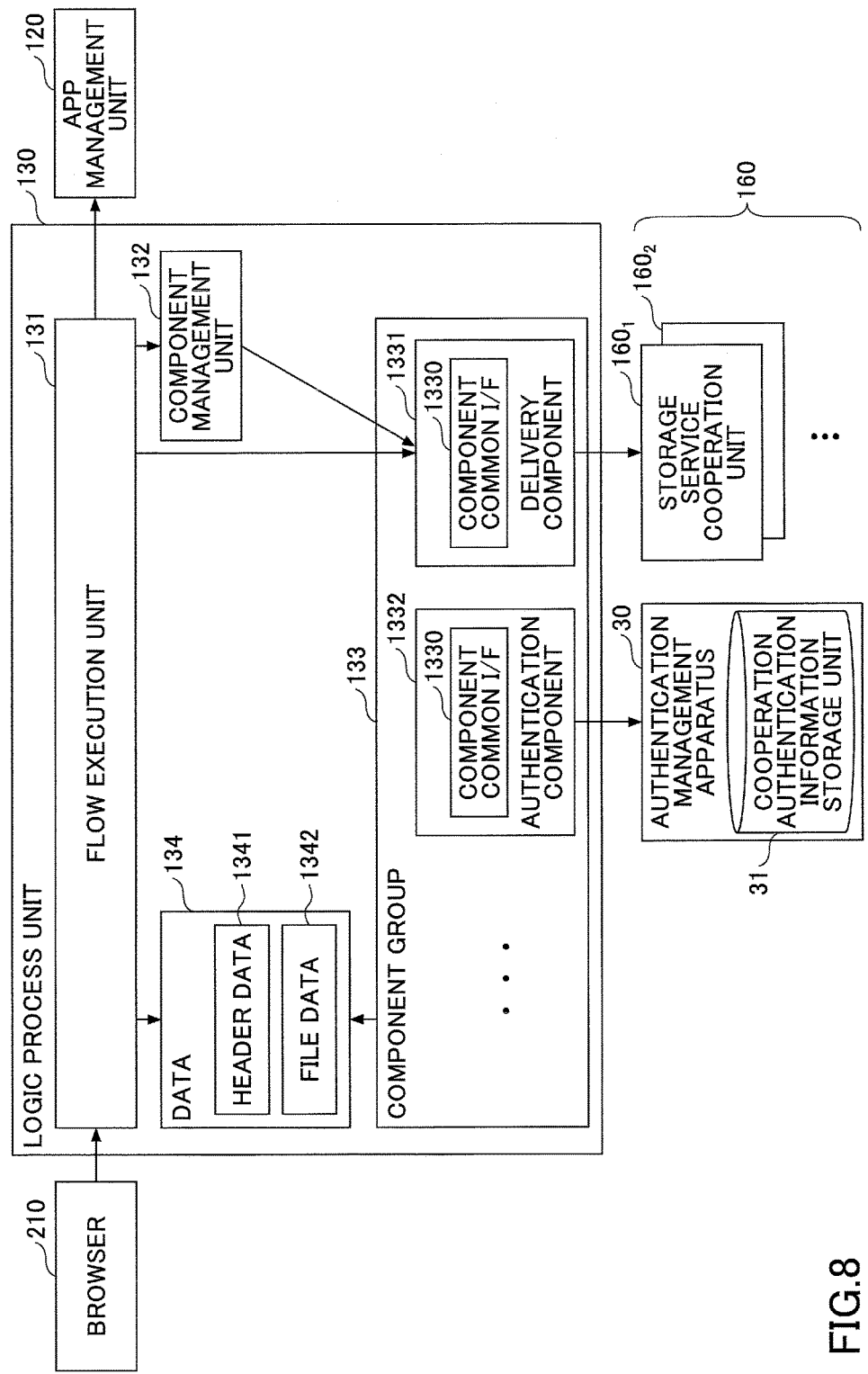
FIG. 8 illustrates an exemplary functional configuration of a logic process unit according to the first embodiment.

In the following, a functional configuration of the logic process unit 130 according to the present embodiment is described with reference to FIG. 8. FIG. 8 is a process block diagram illustrating an exemplary functional configuration of the logic process unit according to the first embodiment. The logic process unit 130 includes a flow execution unit 131, a component management unit 132, a component group 133, and data 134.

When the flow execution unit 131 receives a process execution request from the browser 210 requesting for the execution of a process of providing the scan delivery service, the flow execution unit 131 acquires the corresponding process content from the app information 1000 via the app management unit 120. Then, the flow execution unit 131 issues a process execution request with respect to a relevant component according to the acquired process content. Note that the component described above corresponds to a module or the like for executing various processes. The component may be defined by classes and/or functions, for example.

The component management block 132 generates a component in response to a request from the flow execution unit 131. Note that generating a component refers to loading a component defined by a class into a memory (e.g., RAM 14), for example.

The component group 133 corresponds to a group of components. The component group 133 includes a delivery component 1331 for delivering an electronic file to the external storage system 40, and an authentication component 1332 for acquiring authentication information of the external storage system 40 from the authentication infrastructure (i.e., authentication management apparatus 30). The authentication component 1332 is defined for each authentication infrastructure. Note that the component group 133 may also include an acquisition component for acquiring an electronic file from the external storage system 40 and/or an OCR component for performing an OCR process on an electronic file, for example.

Further, each of these components includes a component common I/F 1330. The component common I/F 1330 includes a group of APIs that are identically defined in each component. For example, the component common I/F 1330 may include an API for generating a component and an API for issuing a process execution request with respect to a component. By arranging each component to include the component common I/F 1330, an impact from adding a component may be localized, for example. In this way, the number of steps required for developing an additional component or the like may be reduced, for example.

The data 134 corresponds to temporary data that is generated and loaded in a memory (e.g., RAM 14) by the flow execution unit 131. The data 134 includes header data 1341 that stores parameters that are exchanged between the components, and file data 1342 that stores electronic data to be processed according to the process content included in the app information 1000. As described below, in the present embodiment, the header data 1341 stores authentication-related information acquired from the authentication management apparatus 30 (e.g., authentication information of the external storage system 40 and/or authentication cookie acquired from the authentication management apparatus 30). On the other hand, the file data 1342 stores an electronic file generated by a scanning operation (i.e., an electronic file to be delivered by the scan delivery service).

As described above, the service providing system 10 according to the present embodiment uses the authentication component 1332 to acquire authentication information of the external storage system 40 from the authentication infrastructure (authentication management apparatus 30). The authentication component 1332 is defined for each authentication infrastructure. In this way, when the image forming apparatus 20 uses a different authentication infrastructure, the image forming apparatus 20 may use the authentication component 1332 for the different authentication infrastructure to acquire the authentication information of the external storage system 40. Thus, the user of the image forming apparatus 20 may be able to flexibly change the authentication infrastructure from which authentication information of an external service is to be acquired.

<Process Details>

In the following, processes implemented by the information processing system 1 according to the present embodiment are described in detail.

«Overall Process of Scan Delivery Service»

Figure 9:
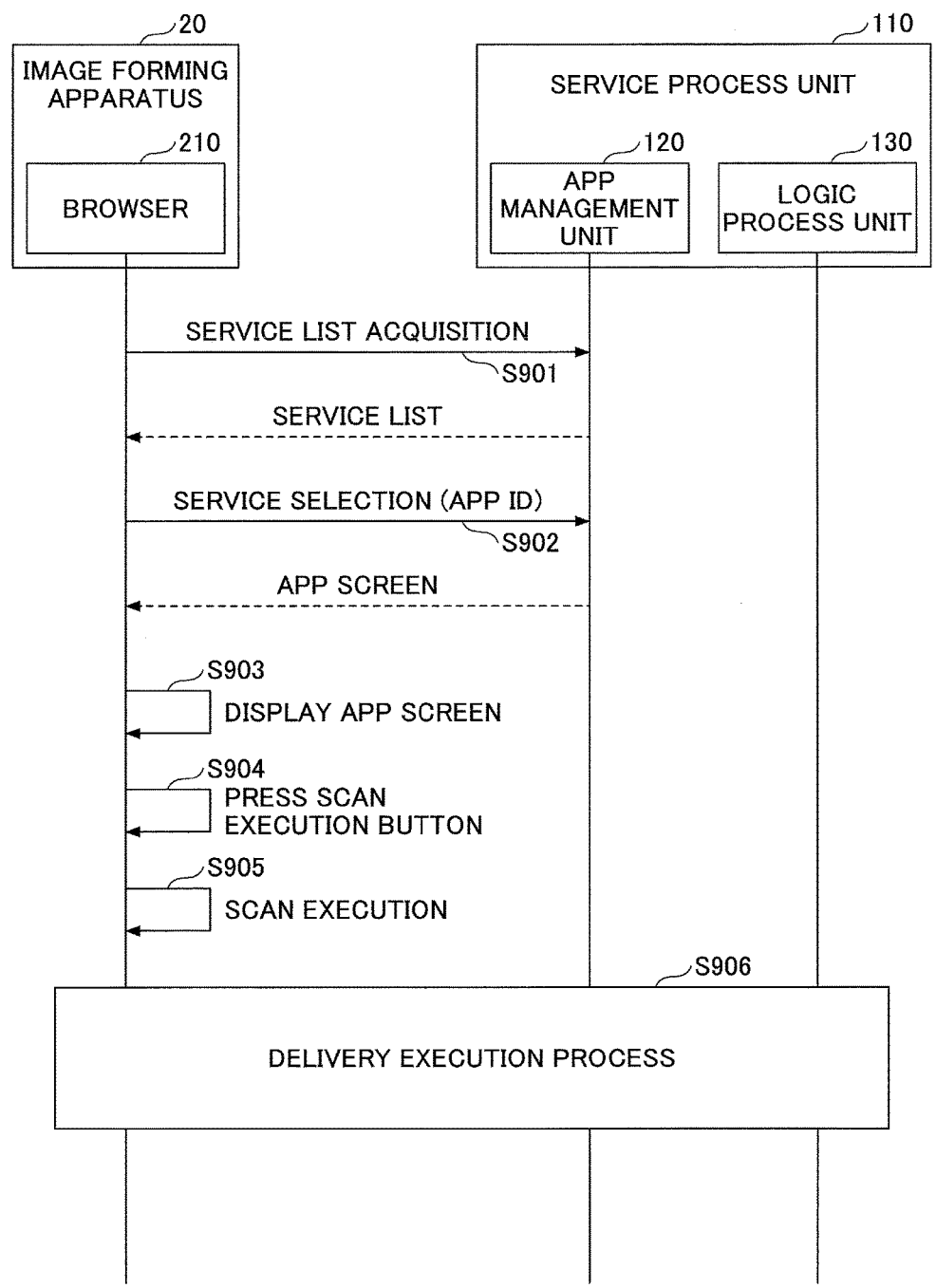
FIG. 9 is a sequence chart illustrating an overall process of a scan delivery service according to the first embodiment.

First, an overall process implemented in a case where a user of the image forming apparatus 20 uses the scan delivery service according to the present embodiment is described. FIG. 9 is a sequence chart illustrating an exemplary overall process of the scan delivery service according to the first embodiment.

First, a user of the image forming apparatus 20 performs an operation for acquiring a list of services provided by the service providing system 10 using the browser 210. In turn, the image forming apparatus 20 transmits a service list acquisition request to the service process unit 110 of the service providing system 10 (step S901). The app management unit 120 of the service process unit 110 receives the service list acquisition request, and transmits a list of services provided by the service providing system 10 to the image forming apparatus 20. In this way, the browser 210 of the image forming apparatus 20 displays the list of services provided by the service providing system 10 at the operation panel 22 of the image forming apparatus 20. Note that the list of services may include the service names of the services provided by the service providing system 10, app IDs of the corresponding app information 1000 for implementing the services, and flow IDs of the process contents included in the corresponding app information 1000.

The user selects a desired service that the user wishes to use from the list of services displayed at the operation panel 22 of the image forming apparatus 20. In turn, the browser 210 sends the app ID of the app information 1000 for implementing the selected service to the app management unit 120 (step S902). In the example described below, it is assumed that "scan delivery service" for scanning and delivering an electronic file to the storage service A has been selected by the user. In this case, the browser 210 transmits the app ID "app001" of the app information $1000_1$ to the app management unit 120. The app management unit 120 generates an app screen in HTML (HyperText Markup Language) format based on the screen definition that is included in the app information $1000_1$ corresponding to the app ID "app001" received from the browser 210, and transmits the generated app screen to the browser 210.

Figure 10:
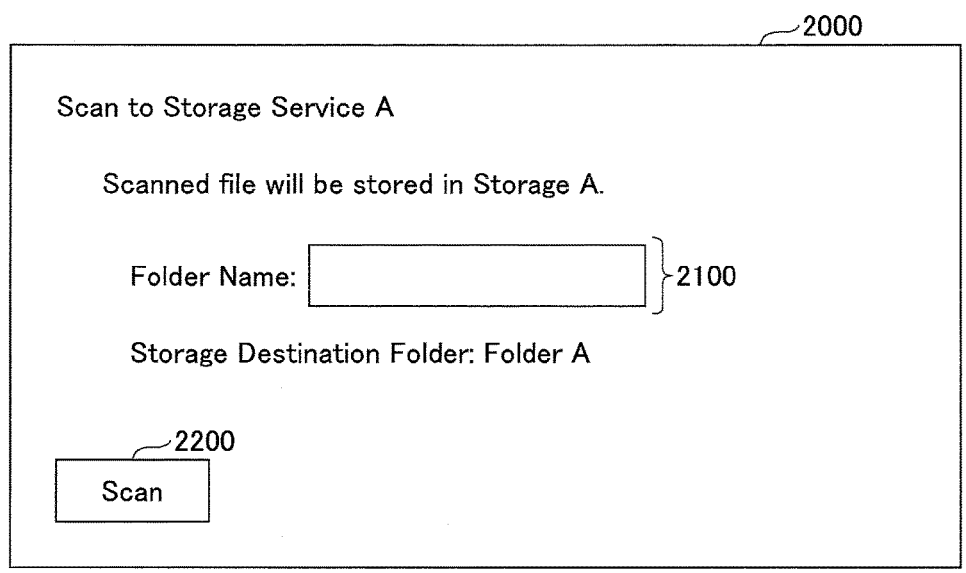
FIG. 10 illustrates an example of an app screen for using the scan delivery service.

When the browser 210 receives the app screen from the app management unit 120, the browser 210 may display an app screen 2000 as illustrated in FIG. 10, for example, at the operation panel 22 (step S903). FIG. 10 illustrates an exemplary app screen 2000 for using the scan delivery service for scanning and delivering an electronic file to the storage service A.

Note that in the app screen 2000 illustrated in FIG. 10, "Folder A" is preset as the storage destination folder within the storage service A. However, in other examples, the user may be able to select the storage destination folder. That is, for example, the data I/F 140 may acquire a list of folders in the storage service A via the data process unit 180, and the user may select a desired storage destination folder from the acquired folder list.

Next, the user inputs a desired file name in a file name input field 2100 of the app screen 2000 illustrated in FIG. 10, sets a document on the scanner 25 of the image forming apparatus 20, and presses a scan execution button 2200 (step S904). In turn, the document is scanned by the scanner 25 of the image forming apparatus 20 and an electronic file with the desired file name is generated (step S905). Then, the image forming apparatus 20 performs a delivery execution process for delivering the generated electronic file to the storage service A (step S906). In the following, the delivery execution process will be described in detail with reference to FIG. 11.

«Delivery Execution Process»

Figure 11:
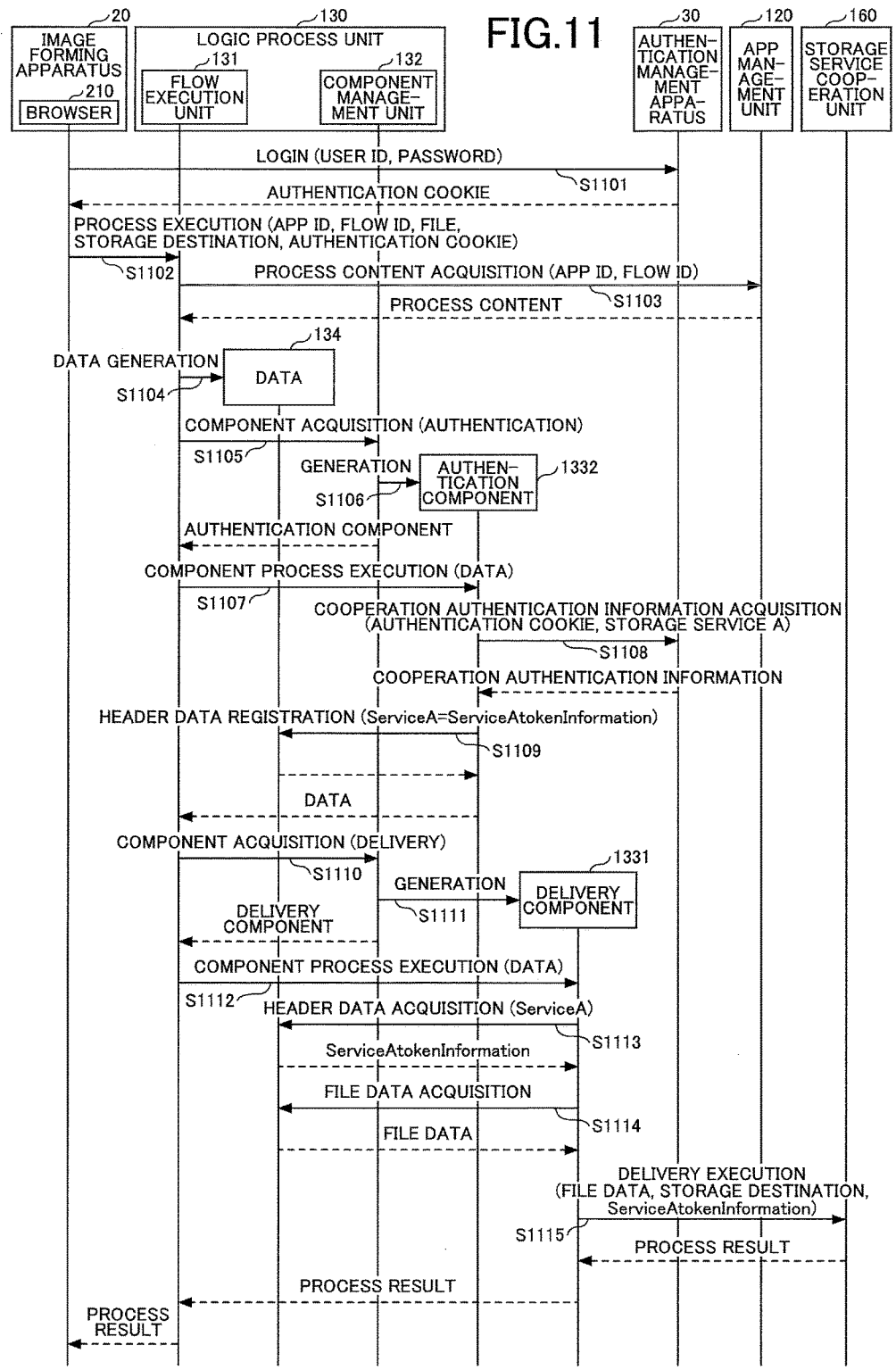
FIG. 11 is a sequence chart illustrating an exemplary delivery execution process according to the first embodiment.

FIG. 11 is a sequence chart illustrating an exemplary delivery execution process according to the first embodiment.

First, the browser 210 of the image forming apparatus 20 sends a login request to the authentication management apparatus 30 and logs into the authentication management apparatus 30 (step S1101). The login request includes a user ID and a password for using the authentication management apparatus 30. In the example described below, it is assumed that the user ID "user001" is designated in the login request. If the login operation is successful, the authentication management apparatus 30 returns an authentication cookie for the user ID to the image forming apparatus 20.

Then, the browser 210 transmits a process execution request for executing a process of the scan delivery service to the flow execution unit 131 (step S1102). In the present example, it is assumed that the process execution request includes the app ID "app001", the flow ID "flow1" identifying the process content to be executed, the electronic file generated by the scanning operation, the folder ID "FolderA" identifying the storage destination folder, and the authentication cookie acquired from the authentication management apparatus 30. When the flow execution unit 131 receives the process execution request, the flow execution unit 131 acquires the process content with the flow ID "flow1" from the app information $1000_1$ with the app ID "app001" that is included in the received process execution request via the app management unit 120 (step S1103). For example, the flow execution unit 131 may acquire the process content as illustrated in FIG. 7.

In turn, the flow execution unit 131 generates the data 134 including the header data 1341 that stores the authentication cookie, and the file data 1342 that stores electronic data generated by the scanning operation (step S1104).

Then, the flow execution unit 131 transmits a component acquisition request to the component management unit 132 according to the process content acquired in step S1103 (step S1105). More specifically, based on ".to("process:auth")" described below "From("file:input")" of the process content illustrated in FIG. 7, the flow execution unit 131 transmits the component acquisition request for acquiring the authentication component 1332 to the component management unit 132.

Upon receiving the component acquisition request for acquiring the authentication component 1332, the component management unit 132 generates the authentication component 1332 (step S1106). The authentication component 1332 can be generated using the API for generating a component that is defined in the component common I/F 1330. When the authentication component 1332 is generated, the component management unit 132 returns the authentication component 1332 to the flow execution unit 131. For example, the component management unit 132 may return an address of the memory (e.g., RAM 14) where the authentication component 1332 has been loaded to the flow execution unit 131.

Then, the flow execution unit 131 designates the data 134 in a component process execution request and sends the component process execution request to the authentication component 1332 that has been generated (step S1107). For example, the flow execution unit 131 may designate an address of the memory (e.g., RAM 14) where the data 134 has been loaded and request the authentication component 1332 to execute a relevant process.

Then, the authentication component 1332 sends a cooperation authentication information acquisition request including the authentication cookie stored in the header data 1341 of the data 134 and a designation of the storage service A to the authentication management apparatus 30 (step S1108). Note that the key information of the authentication information of the storage service A stored in the authentication management apparatus 30 may be used to designate the storage service A, for example. Also, note that the cooperation authentication information acquisition request includes at least the authentication cookie, but does not necessarily have to include the designation of the storage service A.

Then, the authentication management apparatus 30 returns the cooperation authentication information 31D to the authentication component 1332 in response to the cooperation authentication information acquisition request, and the authentication component 1332 acquires the cooperation authentication information 31D. Note that in the example described below, it is assumed that the cooperation authentication information 31D returned by the authentication management apparatus 30 corresponds to cooperation authentication information 31D for the user ID "user001". Note that in some embodiments, the authentication management apparatus 30 may return the authentication information "ServiceAtokenInformation" of the storage service A (i.e., external storage system 40$_1$) and the corresponding key information "ServiceA" that are included in the cooperation authentication information 31D for the user ID "user001" to the authentication component 1332.

Then, the authentication component 1332 stores the authentication information "ServiceAtokenInformation" of the storage service A and the corresponding key information "ServiceA" included in the cooperation authentication information 31D for the user ID "user001" in the header data 1341 of the data 134 (step S1109). More specifically, the authentication component 1332 stores the authentication information "ServiceAtokenInformation" of the storage service A and the corresponding key information "ServiceA" included in the cooperation authentication information 31D as "ServiceA=ServiceAtokenInformation" in the header data 1341 of the data 134.

Then, the flow execution unit 131 sends a component acquisition request to the component management unit 132 according to the process content acquired in step S1103 (step S1110). More specifically, based on ".to("storage:send_to_folder?type=service-a")" described after ".to("process:auth")" of the process content illustrated in FIG. 7, the flow execution unit 131 sends the component acquisition request to the component management unit 132 to acquire the delivery component 1331. Note that in some embodiments, the storage destination (folder ID of the storage destination folder) included in the process execution request issued in step S1102 may be added as an optional parameter in the above process designated in the process content illustrated in FIG. 7, for example.

Upon receiving the component acquisition request for the delivery component 1331, the component management unit 132 generates the delivery component 1331 (step S1111). Note that the delivery component 1331 can be generated using the API for generating a component that is defined in the component common I/F 1330. Then, when the delivery component 1331 is generated, the component management unit 132 returns the delivery component 1331 to the flow execution unit 131. For example, the component management unit 132 may return an address of the memory (e.g., RAM 14) where the delivery component 1331 has been loaded to the flow execution unit 131.

Then, the flow execution unit 131 designates the data 134 in a component process execution request and sends the component process execution request to the delivery component 1331 that has been generated (step S1112). For example, the flow execution unit 131 may designate an address of the memory (e.g., RAM 14) where the data 134 has been loaded and request the delivery component 1331 to execute a relevant process.

The delivery component 1331 designates the key information "ServiceA" of the storage service A and acquires the authentication information "ServiceAtokenInformation" from the header data 1341 of the data 134 (step S1113). In this way, the delivery component 1331 is able to acquire the authentication information of the storage service A corresponding to the delivery destination using the key information of the authentication information managed by the authentication management apparatus 30.

Then, the delivery component 1331 acquires the file data 1342 of the data 134 (step S1114). That is, the delivery component 1331 acquires the file data 1342 that stores the electronic data generated by the scanning operation.

Then, the delivery component 1331 executes a delivery process with respect to the storage service A (step S1115). That is, the delivery component 1331 sends a delivery execution request including the file data 1342, the designation of the storage destination folder within the storage service A, and the authentication information "ServiceAtokenInformation" of the storage service A to the storage service cooperation unit 160$_1$. In this way, the file data 1342 may be delivered to the storage service A using the common I/F 171$_1$ defined in the file process unit 170$_1$ of the storage service cooperation unit 160$_1$. In this case, authentication for gaining access to the external storage system 40$_1$ may be performed using the authentication information "ServiceAtokenInformation" of the storage service A.

In this way, the service providing system 10 according to the present embodiment acquires authentication information of the external storage system 40 using the authentication component 1332 that is defined for each authentication infrastructure. Thus, for example, a component such as the delivery component 1331 that performs a process in cooperation with the external storage system 40 may acquire authentication information of the external storage system 40 using the key information identifying the authentication information of the corresponding external storage system 40 that is managed by the authentication infrastructure (authentication management apparatus 30). Accordingly, for example, in the case of changing the authentication infrastructure to be used by the image forming apparatus 20 to a different authentication infrastructure, the authentication component 1332 corresponding to the different authentication infrastructure may be used. In this way, the authentication infrastructure to be used may be flexibly changed.

Further, for example, in the case of changing the authentication infrastructure to be used by the image forming apparatus 20 to a different authentication infrastructure, the authentication component 1332 corresponding to the different authentication infrastructure may be newly developed. In this way, development may be efficiently performed in response to a change in the authentication infrastructure, for example.

Second Embodiment

In the following, the information processing system 1 according to a second embodiment of the present invention is described. The information processing system 1 according to the second embodiment differs from the information processing system 1 according to the first embodiment in that it includes an authentication management apparatus 50 that is provided within the user environment E2. In the following description of the second embodiment, elements and processes that are substantially identical to those of the first embodiment are given the same reference numerals and descriptions thereof are omitted.

<System Configuration>

Figure 12:
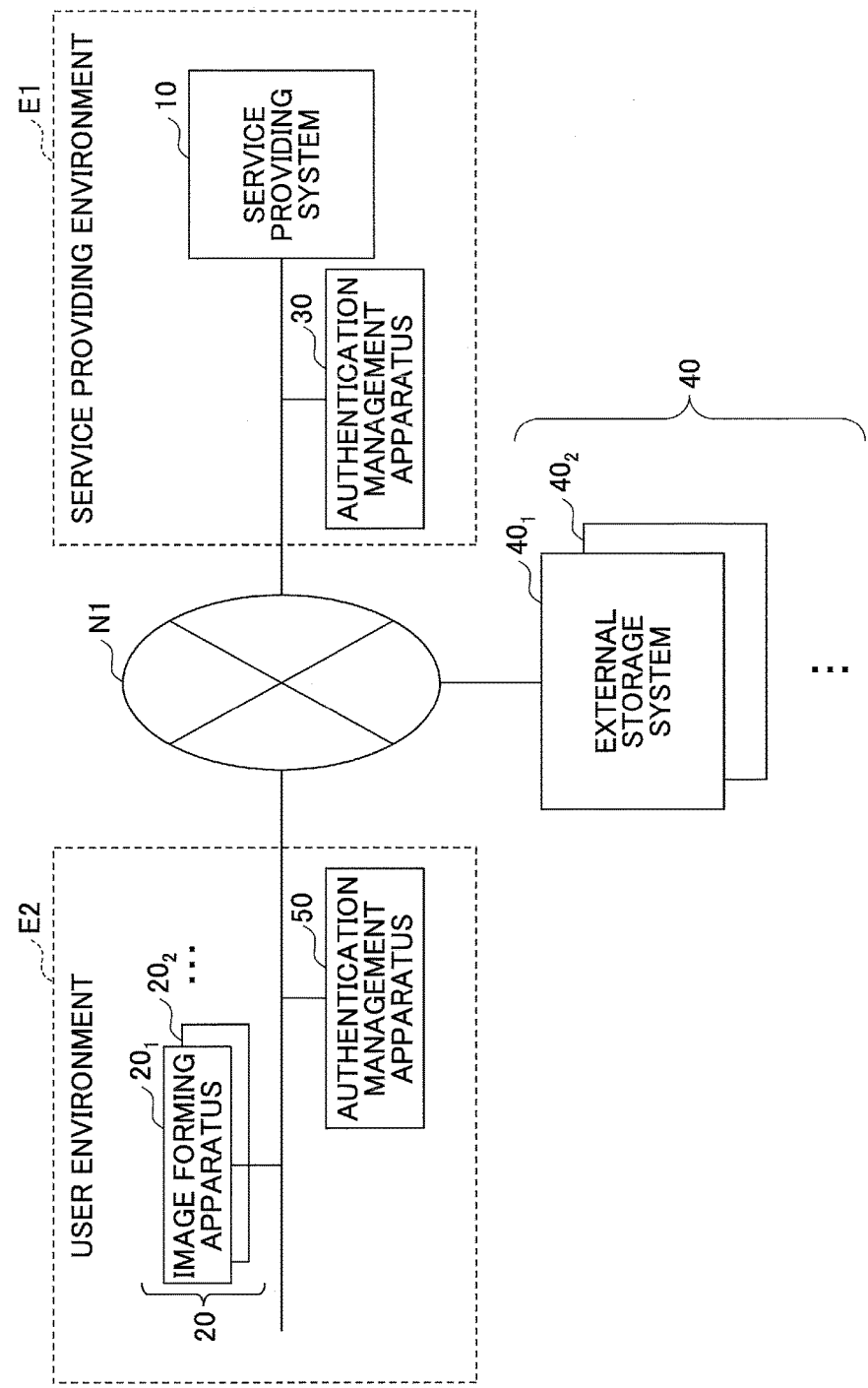
FIG. 12 illustrates an exemplary system configuration of an information processing system according to a second embodiment of the present invention.

In the following, a system configuration of the information processing system 1 according to the second embodiment will be described with reference to FIG. 12. FIG. 12 illustrates an exemplary system configuration of the information processing system 1 according to the second embodiment. In FIG. 12, the information processing system 1 includes the authentication management apparatus 50 within the user environment E2 in addition to the components of the information processing system 1 according to the first embodiment.

The authentication management apparatus 50 is an authentication infrastructure provided within the user environment E2. Note, however, that the authentication management apparatus 50 does not necessarily have to be an independent apparatus, but may be included in the image forming apparatus 20 or some other apparatus within the user environment E2. For example, a program or an application for implementing the functions of the authentication infrastructure (authentication management apparatus 50) may be installed in the image forming apparatus 20.

<Software Configuration>

Figure 13:
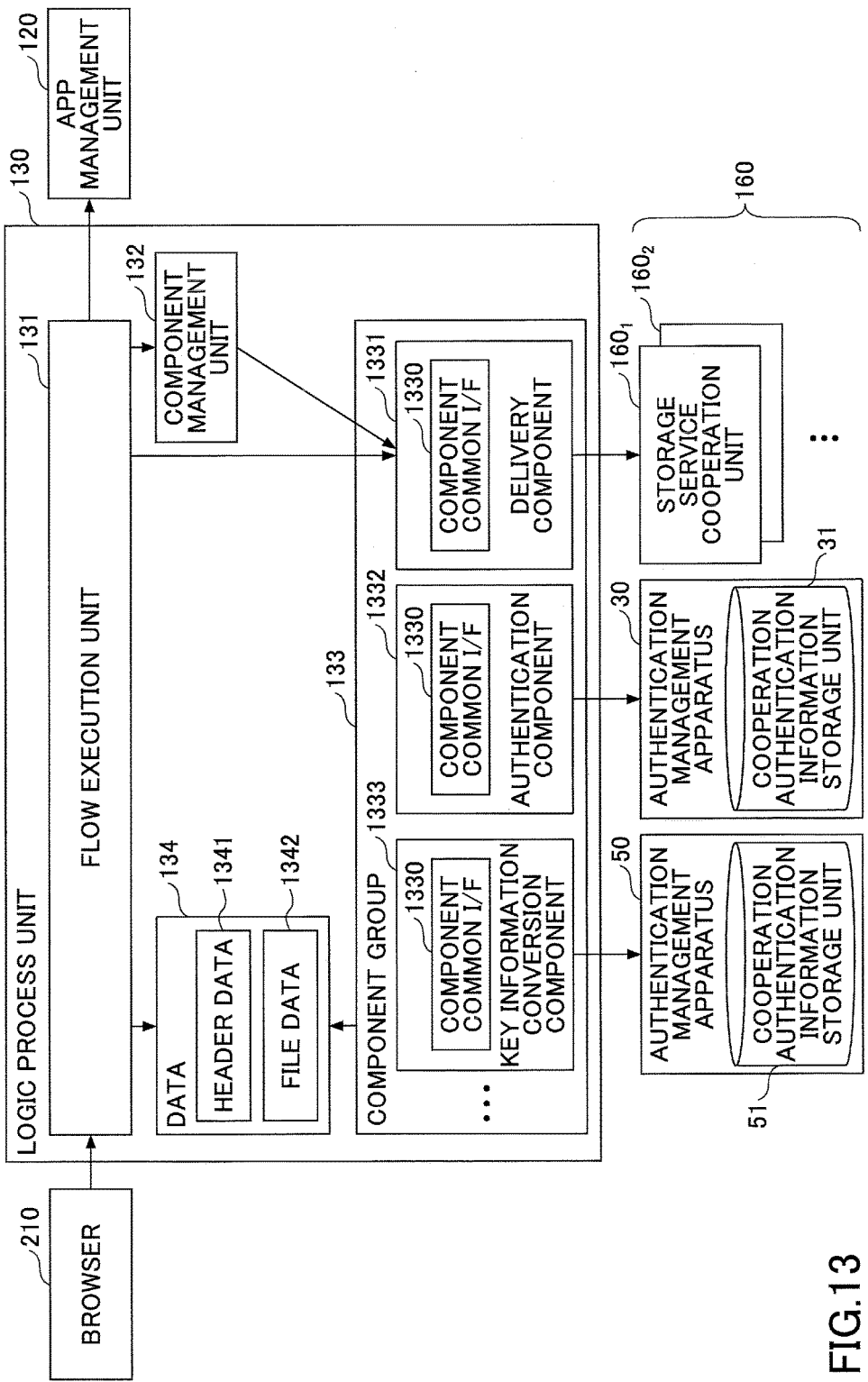
FIG. 13 illustrates an exemplary functional configuration a logic process unit according to the second embodiment.

In the following, a functional configuration of the logic process unit 130 of the information processing system 1 according to the present embodiment will be described with reference to FIG. 13. FIG. 13 is a process block diagram illustrating an exemplary functional configuration of the logic processing unit 130 according to the second embodiment. In FIG. 13, the component group 133 of the logic process unit 130 further includes a key information conversion component 1333 for converting key information identifying the authentication information of the external storage system 40.

Because the authentication management apparatus 50 corresponds to an authentication infrastructure provided within the user environment E2, the key information identifying the external storage system 40 that is managed by the authentication management apparatus 50 may differ from the key information managed by the authentication management apparatus 30. Accordingly, in the present embodiment, the component group 133 includes the key information conversion component 1333 for converting key information acquired from the authentication management apparatus 50 into key information that can be recognized by a component such as the delivery component 1331 that performs a process in cooperation with the external storage system 40.

Also, the authentication management apparatus 50 includes a cooperation authentication information storage unit 51. The cooperation authentication information storage unit 51 may be implemented by a storage device of the authentication management apparatus 50, for example. The cooperation authentication information storage unit 51 stores cooperation authentication information 51D including authentication information of the external storage system 40 that is to cooperate with the service providing system 10 to execute a process. For example, as illustrated in FIG. 14, the cooperation authentication information 51D may store, with respect to each "user ID", "key information" for identifying the authentication information of the external storage system 40 within the authentication management apparatus 50 and "cooperation destination information" indicating the name of the external storage system 40. Also, the cooperation authentication information 51D may store "authentication information" for using the external storage system 40 with respect to each "user ID".

<Process Details>

In the following, a process implemented by the information processing system 1 according to the present embodiment will be described in detail.

«Delivery Execution Process»

Figure 15:
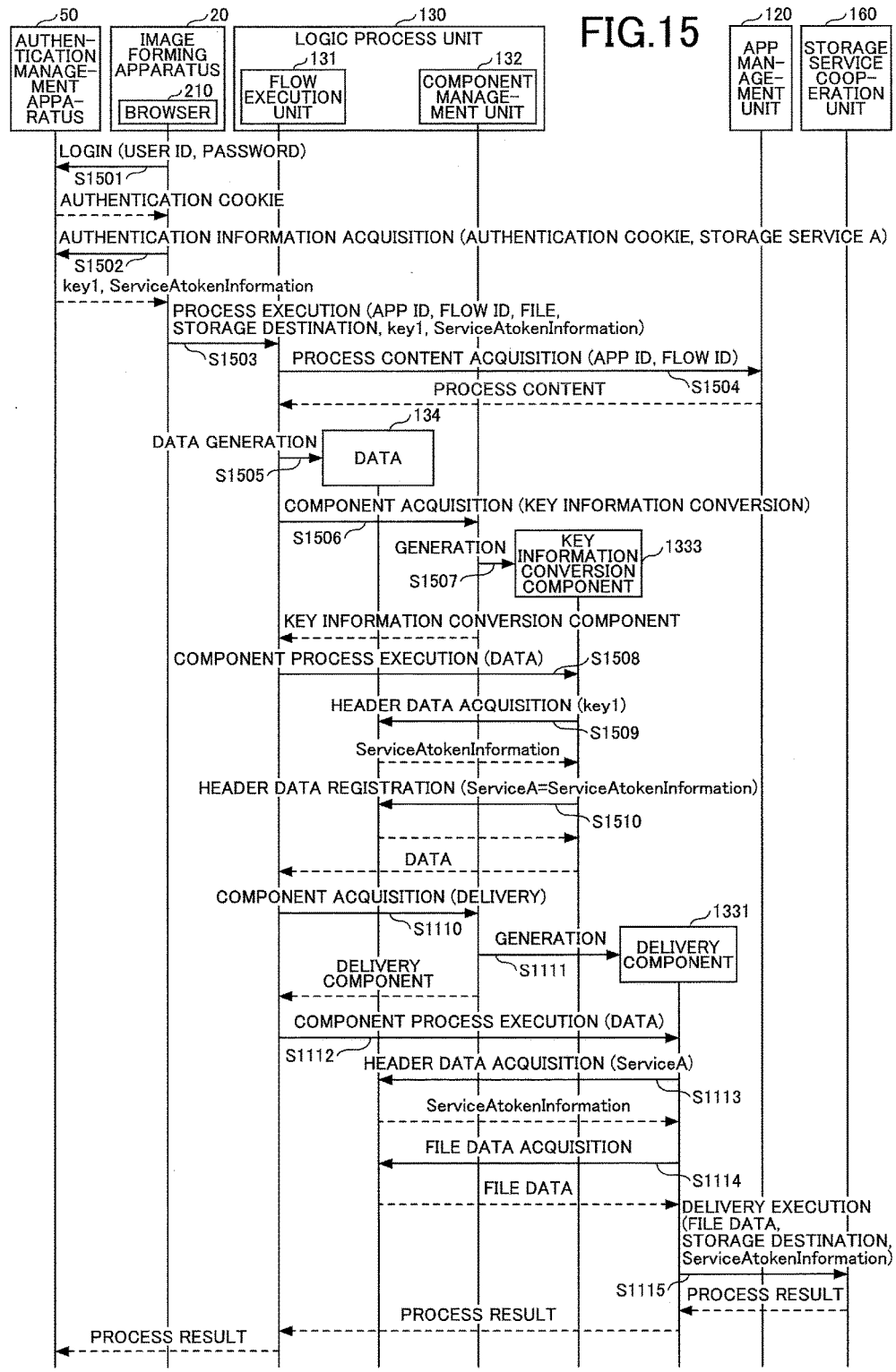
FIG. 15 is a sequence chart illustrating an exemplary delivery execution process according to the second embodiment.

FIG. 15 is a sequence chart illustrating an exemplary delivery execution process according to the second embodiment.

First, the browser 210 of the image forming apparatus 20 sends a login request to the authentication management apparatus 50, and logs into the authentication management apparatus 50 (step S1501). The login request includes a user ID and a password for using the authentication management apparatus 50. In the present example, it is assumed that the user ID "user001" is designated in the login request. When the login operation is successful, the authentication management apparatus 50 returns an authentication cookie for the user ID to the image forming apparatus 20.

Then, the browser 210 designates the storage service A and includes the authentication cookie in an authentication information acquisition request and sends the authentication information acquisition request to the authentication management unit 50 (step S1502). Note that the key information identifying the authentication information of the storage service A that is managed by the authentication management apparatus 50 may be used to designate the storage service A, for example. In this way, the image forming apparatus 20 acquires the authentication information "ServiceAtokenInformation" and the key information "key1" identifying the above authentication information that are included in the cooperation authentication information 51D illustrated in FIG. 14. As described above, in the case where an authentication infrastructure is provided within the user environment E2, the image forming apparatus 20 acquires the authentication information of the desired storage service and the key information identifying the authentication information from the authentication infrastructure provided within the user environment E2.

Then, the browser 210 sends a process execution request for executing a process of the scan delivery service to the flow execution unit 131 (step S1503). In the present example, it is assumed that the process execution request includes the application ID "app001", the flow ID "flow2" identifying the process content to be executed, the electronic file generated by the scanning operation, and the folder ID "FolderA" identifying the storage destination folder. Note that in the present example, the flow ID included in the process execution request is "flow2" corresponding to the process content as illustrated in FIG. 16 (described below).

Also, the process execution request includes the key information "key1" and the authentication information "ServiceAtokenInformation" that have been acquired by the image forming apparatus 20 from the authentication management apparatus 50.

Upon receiving the process execution request, the flow execution unit 131 acquires the process content with the flow ID "flow2" from the app information 1000$_1$ with the app ID "app001" that is designated in the received process execution request via the app management unit 120 (step S1504). For example, the flow execution unit 131 may acquire the process content as illustrated in FIG. 16. Note that "to.("process:local_auth")" of the process content illustrated in FIG. 16 indicates that the authentication infrastructure provided within the user environment E2 (i.e., authentication management apparatus 50) is to be used.

Then, the flow execution unit 131 generates the data 134 including the header data 1341 that stores the key information "key1" and the authentication information "ServiceAtokenInformation", and the file data 1342 that stores the electronic data generated by the scanning operation (step S1505). More specifically, the flow execution unit 131 generates the data 134 by storing the key information "key1"

and the authentication information "ServiceAtokenInformation" as "key1=ServiceAtokenInformation" in the header data 1341.

Then, the flow execution unit 131 sends a component acquisition request to the component management unit 132 according to the process content acquired in step S1504 (step S1506). More specifically, based on ".to("process: local_auth")" described after "From("file:input")" of the process content illustrated in FIG. 16, the flow execution unit 131 sends the component acquisition request to the component management unit 132 to acquire the key information conversion component 1333.

Upon receiving the component acquisition request for the key information conversion component 1333, the component management unit 132 generates the key information conversion component 1333 (step S1507). Note that the key information conversion component 1333 can be generated using the API for generating a component that is defined in the component common I/F 1330. Then, when the key information conversion component 1333 is generated, the component management unit 132 returns the generated key information conversion component 1333 to the flow execution unit 131. For example, the component management unit 132 may return an address of the memory (e.g., RAM 14) where the key information conversion component 1333 has been loaded to the flow execution unit 131.

Then, the flow execution unit 131 sends a process execution request to the generated key information conversion component 1333, designating the data 134 (step S1508). For example, the flow execution unit 131 may designate an address of the memory (e.g., RAM 14) where the data 134 has been loaded and request the key information conversion component 1333 to execute a relevant process.

Then, the key information conversion component 1333 designates the key information "key1" identifying the authentication information of the storage service A within the authentication management unit 50, and acquires the authentication information "ServiceAtokenInformation" from the header data 1341 of the data 134 (step S1509).

Then, the key information conversion component 1333 associates the key information "ServiceA" with the acquired authentication information "ServiceAtokenInformation" of the storage service A, and stores the associated key information and authentication information in the header data 1341 of the data 134 (step S1510). More specifically, the key information conversion component 1333 stores the acquired authentication information "ServiceAtokenInformation" of the storage service A as "ServiceA=ServiceAtokenInformation" in the header data 1341 of the data 134. That is, the key information conversion component 1333 converts the key information "key1" of the authentication information that is stored in the header data 1341 (i.e., the key information identifying the authentication information within the authentication management apparatus 50) into the key information "ServiceA" identifying the authentication information within the authentication management apparatus 30. In this way, the key information stored in the header data 1341 may be converted into key information that can be recognized by a component such as the delivery component 1331 that executes a process in cooperation with the external storage system 40, for example.

As described above, in the service providing system 10 according to the second embodiment, an authentication infrastructure that manages identification information (key information) identifying authentication information of an external storage system 40 that is different from the identification information (key information) identifying the same external storage system 40 in the authentication infrastructure provided within the service providing environment E1 may be used. Thus, for example, the user of the image forming apparatus 20 may be able to use a desired authentication infrastructure such as the authentication infrastructure provided within the user environment E2.

According to an aspect of the first embodiment, the service providing system 1 acquires authentication information of the external storage system 40 using the authentication component 1332 that is defined for each authentication infrastructure. Thus, in the case of changing the authentication infrastructure to be used by a device such as the image forming apparatus 20 to a different authentication infrastructure, the authentication component 1332 that corresponds to the different authentication infrastructure may be used, for example. In this way, the authentication infrastructure to be used can be flexibly changed.

According to an aspect of the second embodiment, the service providing system 1 converts identification information of authentication information that is managed by an authentication infrastructure existing outside (i.e., in an environment other than the service providing environment E1). In this way, a device such as the image forming apparatus 20 may be able to use a desired authentication infrastructure. That is, the device such as the image forming apparatus 20 may use an authentication infrastructure provided within the user environment E2 or an authentication infrastructure included in the device itself, for example.

Although the present invention has been described above with reference to certain illustrative embodiments, the present invention is not limited to these embodiments, and numerous variations and modifications may be made without departing from the scope of the present invention.

Note that the logic process unit 130 described above is an exemplary embodiment of a receiving unit, an acquisition unit, and an execution unit according to the present invention. The app information storage unit 190 is an exemplary embodiment of a storage unit according to the present invention. The authentication cookie is an exemplary embodiment of first authentication information according to the present invention, and the authentication information of the external storage system 40 stored in the cooperation authentication information 31D and 51d are exemplary embodiments of second authentication information according to the present invention. The authentication component 1332 is an exemplary embodiment of a first component, the key information conversion component 1333 is an exemplary embodiment of a second component, and the delivery component 1331 is an exemplary embodiment of a third component according to the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2015-044571 filed on Mar. 6, 2015, the entire contents of which are hereby incorporated by reference.

What is claimed is:

1. An information processing system including at least one information processing apparatus, the information processing system comprising:
 a processor; and
 a memory that stores program instructions that cause the processor to:
  store, in a storage device, with respect to each application, application identification information identifying the application for executing a series of processes using electronic data in cooperation with an external service and information relating to the series of processes in association with each other,
  receive from a connected device that is connected to the information processing system, a request including first authentication information acquired by the connected device from an authentication infrastructure, the application identification information, and information relating to designated electronic data that has been designated by a user at the connected device,
  generate a first component based on the first authentication information, the application identification information, and the information relating to designated electronic data,
  acquire second authentication information for using the external service via the generated first component, and
  execute a process based on the information relating to the series of processes that is stored in the storage device in association with the application identification information included in the received request, the process being executed with respect to the designated electronic data that is identified based on the information relating to the designated electronic data included in the request, and using the acquired second authentication information to execute the process, wherein
  upon receiving the second authentication information, the processor stores the acquired second authentication information as part of metadata associated with the designated electronic data.

2. The information processing system as claimed in claim 1, wherein
 the first component transmits the first authentication information that is included in the request to the authentication infrastructure, acquires authentication information of a plurality of external services that is returned by the authentication infrastructure in response to receiving the first authentication information, and acquires the second authentication information from the returned authentication information of the plurality of external services upon receiving the request from the connected device.

3. The information processing system as claimed in claim 1, wherein
 the first component transmits to the authentication infrastructure, the first authentication information that is included in the request and a designation of the external service to be used in the process to be executed based on the information relating to the series of processes, and acquires the second authentication information that is returned by the authentication infrastructure in response to receiving the first authentication information and the designation of the external service upon receiving the request from the one device.

4. The information processing system as claimed in claim 1, wherein execution of the program instructions further cause the processor to:
 generate a second component configured to convert first identification information for identifying the second authentication information within the authentication infrastructure into second identification information for identifying the second authentication information within the information processing system, wherein
 the second component converts the first identification information for identifying the second authentication information that is included in the request into the second identification information for identifying the second authentication information within the information processing system, the second identification information being used to acquire the second authentication information upon receiving the request from the one device.

5. The information processing system as claimed in claim 1, wherein execution of the program instructions further cause the processor to:
 generate a third component configured to execute the process in cooperation with the external service, wherein
 the third component executes the process, when the processor acquires the second authentication information, based on the information relating to the series of processes that is stored in the storage device in association with the application identification information included in the received request, the process being executed with respect to the designated electronic data that is identified based on the information relating to the designated electronic data included in the request, and the third component using the second authentication information to execute the process.

6. An information processing apparatus comprising:
 a processor; and
 a memory that stores program instructions that cause the processor to:
  store, in a storage device, with respect to each application, application identification information identifying the application for executing a series of processes using electronic data in cooperation with an external service and information relating to the series of processes in association with each other, receive from a device connected to the information processing apparatus, a request including first authentication information acquired by the device from an authentication infrastructure, the application identification information, and information relating to designated electronic data that has been designated by a user at the device, generate a first component based on the first authentication information, the application identification information, and the information relating to designated electronic data, acquire second authentication information for using the external service via the generated first component, and acquire second authentication information for using the external service based on the first authentication information included in the received request; and execute a process based on the information relating to the series of processes that is stored in the storage device in association with the application identification information included in the received request, the process being executed with respect to the designated electronic data that is identified based on the information relating to the designated electronic data included in the request, and the processor using the acquired second authentication information to execute the process, wherein upon receiving the second authentication information, the processor stores the acquired second authentication information as part of metadata associated with the designated electronic data.

7. An information processing method that is implemented by an information processing system including a storage device configured to store, with respect to each application, application identification information identifying the application for executing a series of processes using electronic data in cooperation with an external service and information relating to the series of processes in association with each other, the information processing method comprising:

receiving from one device from among one or more devices connected to the information processing system, a request that includes first authentication information acquired by the one device from an authentication infrastructure, the application identification information, and information relating to designated electronic data that has been designated by a user at the one device;

generating a first component based on the first authentication information, the application identification information, and the information relating to designated electronic data, acquiring second authentication information for using the external service via the generated first component; and executing a process based on the information relating to the series of processes that is stored in the storage device in association with the application identification information included in the received request, the process being executed with respect to the designated electronic data that is identified based on the information relating to the designated electronic data included in the received request, and using the acquired second authentication information to execute the process, wherein upon receiving the second authentication information, the processor stores the acquired second authentication information as part of metadata associated with the designated electronic data.

\* \* \* \* \*